United States Patent [19]
Seifert et al.

[11] 3,890,772
[45] June 24, 1975

[54] SELF-PROPELLED LAWN MOWER

[76] Inventors: Lester H. Seifert, R.R. No. 2, Park Ave., Kiel, Wis. 53042; Raymond P. Powers, 3515 N. 10th St., Sheboygan, Wis. 53081; William M. Schmidt, 35 Claireview Rd., Grosse Point Farms; Stanley E. Thorwaldsen, 286 Williams St., Grosse Point, both of Mich. 48236; Frederick Smith, 247 Cambridge, Mt. Clemens, Mich. 48043; David C. McElroy, 22000 St. Gertrude, St. Clair Shores, Mich. 48081; Roy P. Dunton, 37446 Charter Oaks, Mt. Clements, Mich. 48043

[22] Filed: Feb. 1, 1974

[21] Appl. No.: 438,589

Related U.S. Application Data

[62] Division of Ser. No. 289,539, Sept. 15, 1972, Pat. No. 3,802,170.

[52] U.S. Cl. ................................. 56/202; 15/350
[51] Int. Cl. ............................................ A01d 35/22
[58] Field of Search ..................... 56/194–206; 15/350, 351, 83, 330

[56] References Cited
UNITED STATES PATENTS

| | | | |
|---|---|---|---|
| 1,431,634 | 10/1922 | Clements | 15/354 |
| 2,918,694 | 12/1959 | Tarrant | 15/350 |
| 2,970,422 | 2/1961 | Kroll et al. | 56/202 |
| 3,112,511 | 12/1963 | Lankenau | 15/350 |
| 3,143,842 | 8/1964 | Mattson et al. | 56/202 |
| 3,618,157 | 11/1971 | Bassin | 15/330 |
| 3,624,699 | 11/1971 | Hoffmann | 56/202 |

*Primary Examiner*—Russell R. Kinsey
*Attorney, Agent, or Firm*—Andrus, Sceales, Starke & Sawall

[57] ABSTRACT

A self-propelled rotary lawn mower. The drive shaft of the engine is operably connected through a clutch mechanism to the cutting blade and to a belt drive connected the front wheels to drive the mower across the terrain. By disengaging the clutch through manual action of a cable, the driving connection to both the blade and the wheels is stopped, so that the blade will not rotate when the mower is stationary. The housing of the mower includes inner and outer housing sections with the space between the housing sections defining a chamber. The exhaust gases from the engine are directed into the chamber and are discharged from the chamber adjacent the grass discharge outlet in the housing. Directing the exhaust gases through the internal housing chamber substantially decreases the noise level of the mower. The four wheels of the mower are adapted to be raised and lowered in unison by single lever control to thereby vary the height of the blade above the ground. A handle assembly is utilized which is adapted to fold for storage so that the entire handle is located within the perimeter of the housing to facilitate handling and shipment of the mower.

5 Claims, 18 Drawing Figures

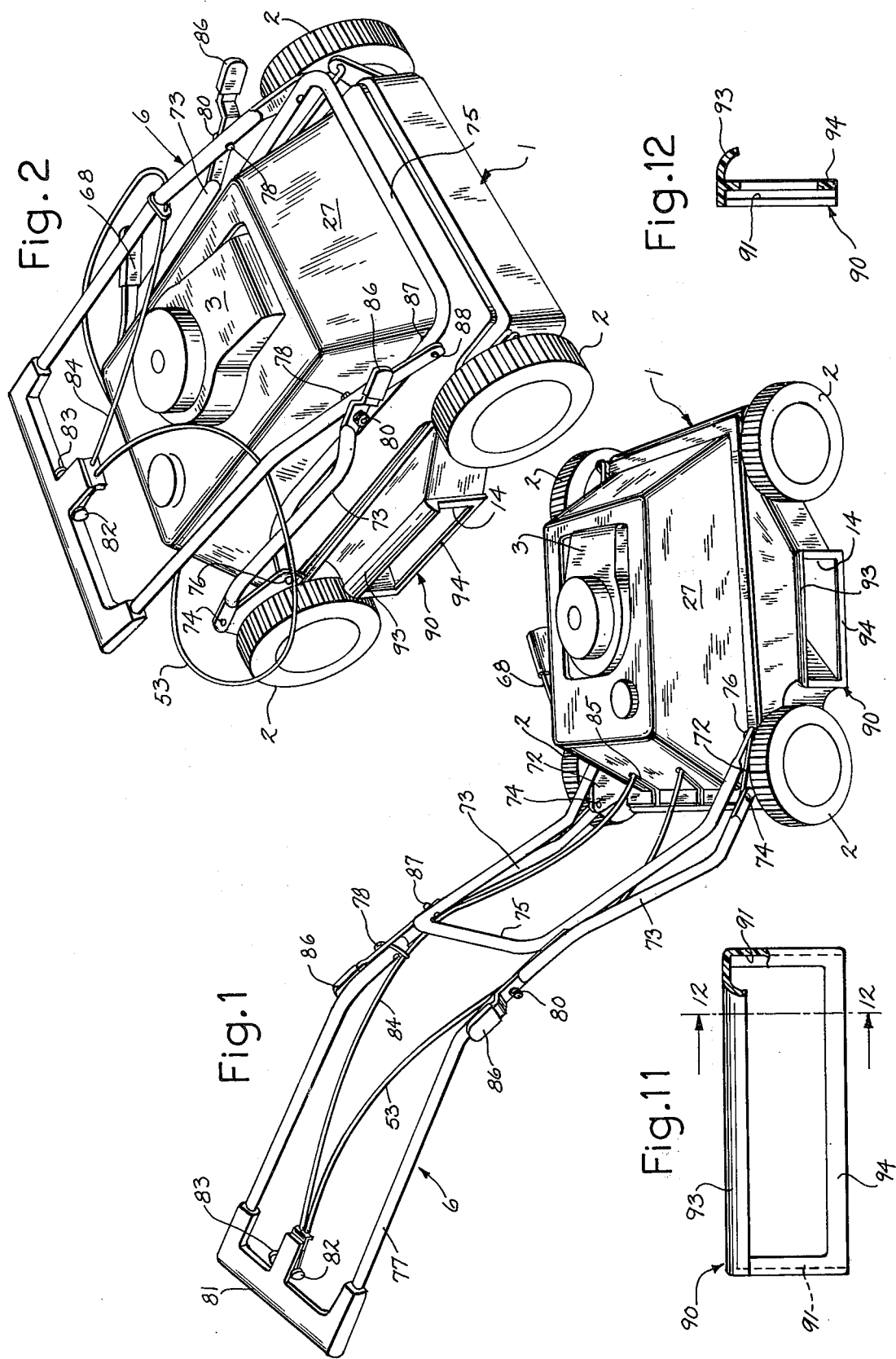

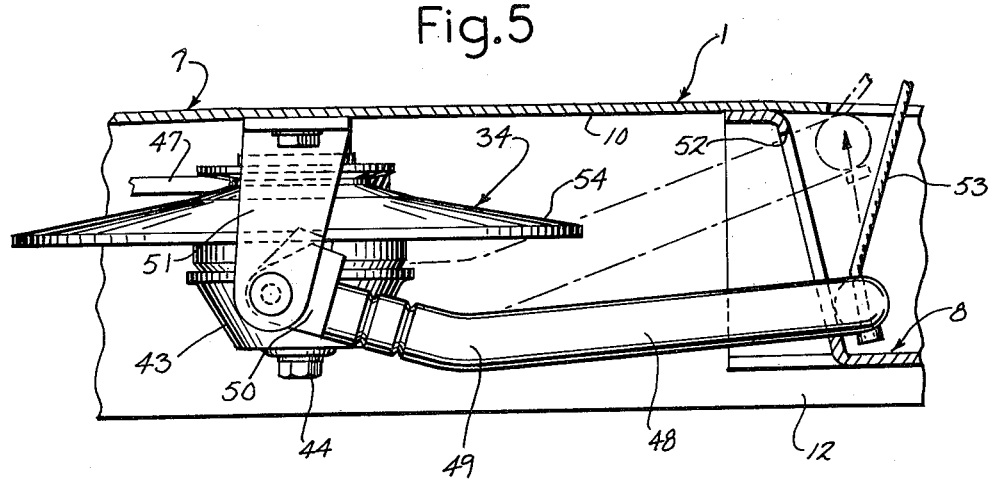
Fig.5
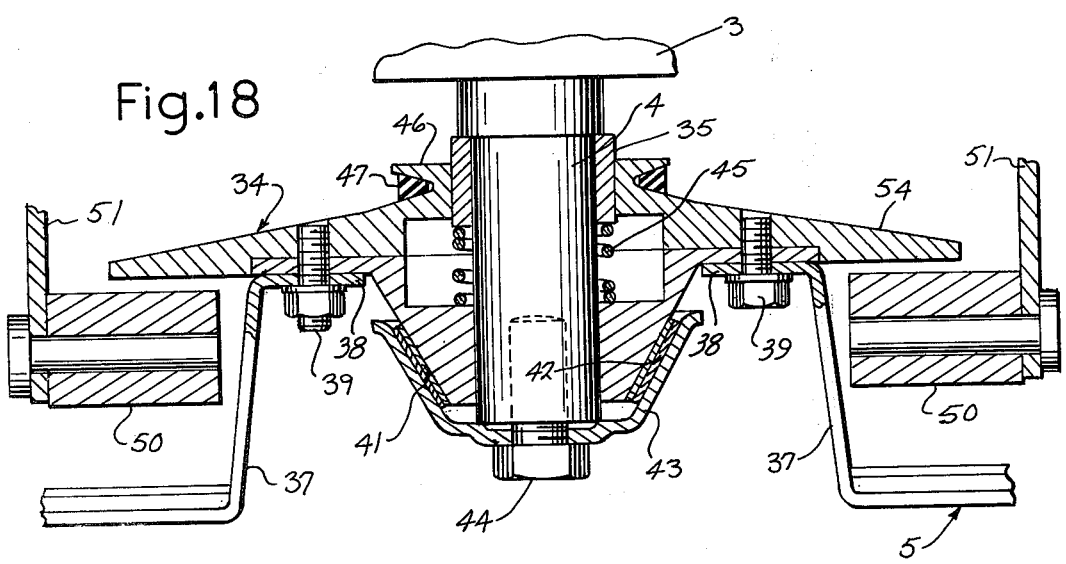
Fig.18
Fig.17
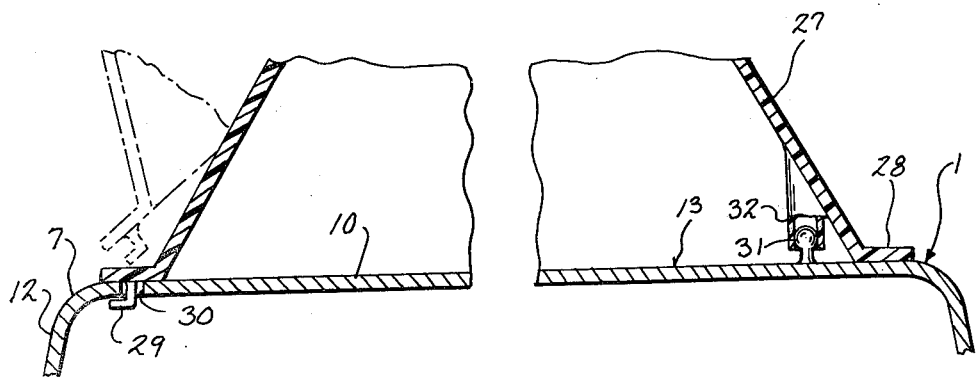

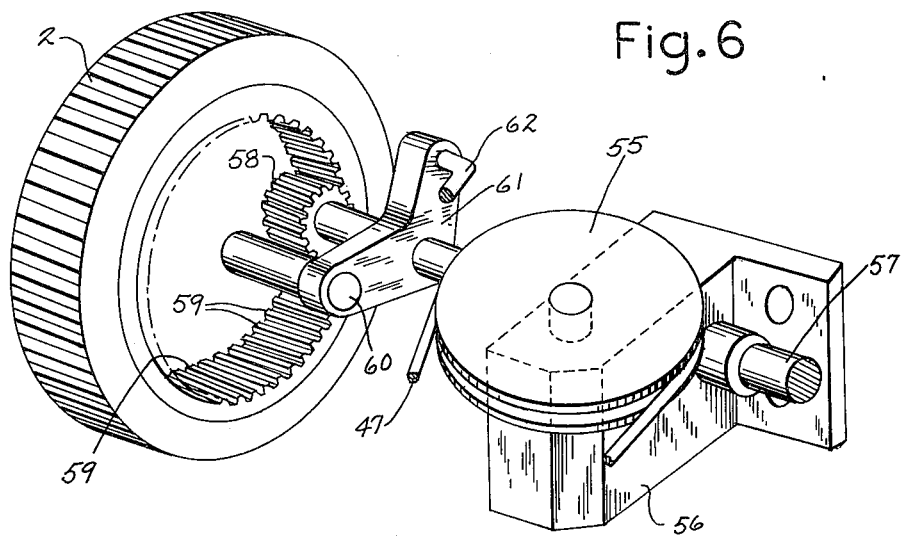
Fig.6
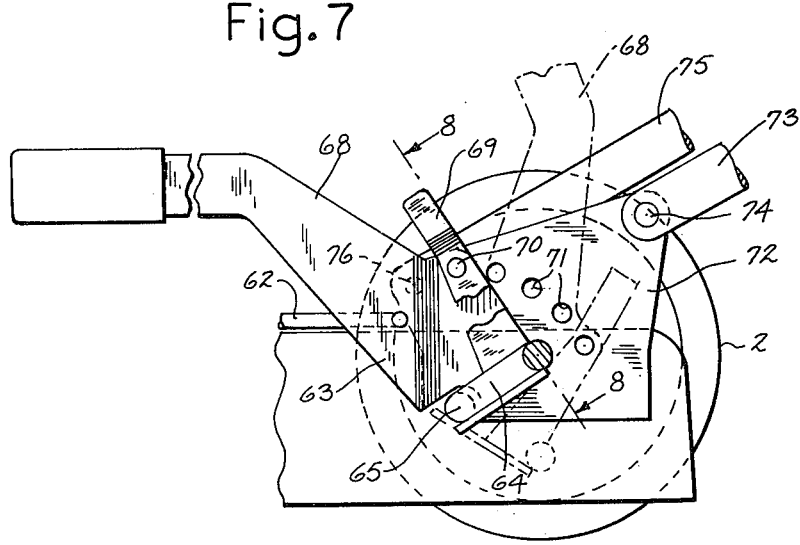
Fig.7
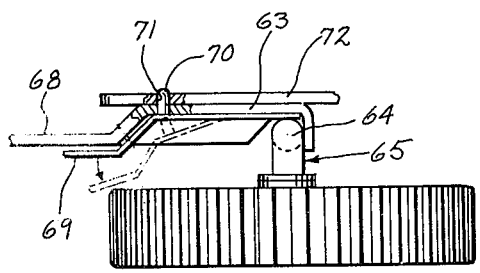
Fig.8
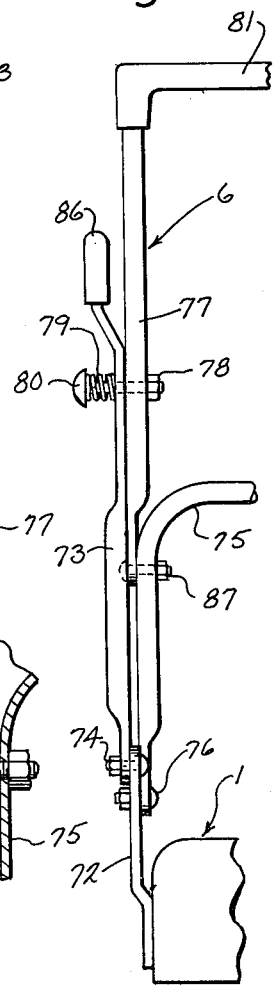
Fig.9
Fig.10

SELF-PROPELLED LAWN MOWER

This is a division of application Ser. No. 289,539, filed Sept. 15, 1972 and now Patent 3,802,170.

BACKGROUND OF THE INVENTION

In the conventional rotary lawn mower the engine is mounted on a housing and the drive shaft extends downwardly within the housing and is operably connected to one or more rotary blades. Larger sized rotary lawn mowers are frequently self-propelled in which an auxiliary drive connects the engine drive shaft with the wheels to drive the lawn mower across the ground. With the conventional self-propelled rotary mowers, the drive to the cutting blade is independent of the wheel drive so that if the forward motion of the mower is stopped, the blade will continue to operate, thereby presenting a potential hazard to the operator who may occasionally attempt to reach under the mower when the mower is stopped to remove objects from the housing.

Recently, there has been increased interest in controlling noise pollution of lawn mowers and many attempts have been made to reduce the noise level by use of more elaborate and effective muffler systems. The noise level controls have not been entirely successful, in that they have either been inefficient or exceedingly costly to incorporate with a conventional type mower.

SUMMARY OF THE INVENTION

The invention relates to an improved rotary lawn mower. The mower includes a housing which supports the engine and the drive shaft extends downwardly from the engine within the housing and carries a rotary cutting blade. In addition, a belt drive connects the engine drive shaft with the front wheels of the mower so that the mower can be driven across the ground.

In accordance with one feature of the invention, a clutch mechanism interconnects the drive shaft with both the cutting blade and the belt drive to the wheels so that when the clutch is manually disengaged through actuation of a cable, the wheel drive is stopped and the driving connection to the blade is simultaneously disengaged so that the blade will not rotate when the mower is not propelled.

As a further feature of the invention, the housing is composed of an outer housing member and an inner housing member with the space between the housing members defining a chamber. The exhaust gases of combustion from the engine are directed into the chamber, with or without having passed through a conventional muffler, and the exhaust gases are then discharged from the housing chamber through discharge ports positioned adjacent the grass discharge outlet in the housing. This construction provides an effective muffling system to reduce the level of noise of the mower.

The invention also includes a mechanism for raising and lowering all four wheels in unison with respect to the housing to thereby vary the cutting height by use of a single, manually controlled lever. The lever acts through linkages connected to all four wheels so that the height of the wheels can be adjusted relative to the housing to vary the cutting height of the blade.

The mower of the invention also includes a unique handle assembly which is adapted to be folded for storage so that the entire handle is within the confines or perimeter of the housing. This not only provides a more compact unit for storage and shipment, but also enables the handle to be attached to the mower at the factory, thereby resulting in faster showroom and customer set-up of the mower as no handle installation is required in the field.

A throw-away plastic grass catching bag is also adapted to be associated with the mower. The bag is attached to a frame located at the discharge end of a chute that is slidably mounted on the housing and communicates with the grass discharge outlet. The frame to which the bag is attached, includes a pair of vertically stacked openings, with the lower of the pair of openings being in communication with the chute and the upper opening being exposed to the atmosphere. The grass clippings exiting from the mower housing are discharged through the chute and through the lower frame opening into the bag. As the bag is impervious, the air will reverse its travel 180° and be discharged through the upper opening in the frame to the atmosphere. With the use of the throw-away plastic bag it is not necessary to transfer grass clippings from the grass-catching bag into a receptacle, but instead the entire bag can be discarded and replaced with a new bag.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of the mower of the invention with the handle in the extended operating position;

FIG. 2 is a perspective view of the mower with the handle in the folded storage position;

FIG. 5 is a section taken along line 5—5 of FIG. 4;

FIG. 6 is a schematic perspective view of the wheel drive mechanism;

FIG. 7 is a section taken along line 7—7 of FIG. 3, and showing the operating lever for raising and lowering the wheels and the locking mechanism for locking the wheels with respect to the housing;

FIG. 8 is a section taken along line 8—8 of FIG. 7;

FIG. 9 is an end view of a portion of the folding handle assembly;

FIG. 10 is an enlarged sectional view showing the locking mechanism for the handle assembly;

FIG. 11 is a front elevation of the deflector plate;

FIG. 12 is a section taken along line 12—12 of FIG. 11;

FIG. 17 is a vertical section with parts broken away showing the attachment of the shroud to the housing; and FIG. 18 is an enlarged vertical section showing the clutch mechanism.

DESCRIPTION OF THE PREFERRED EMBODIMENT

Figure 3:
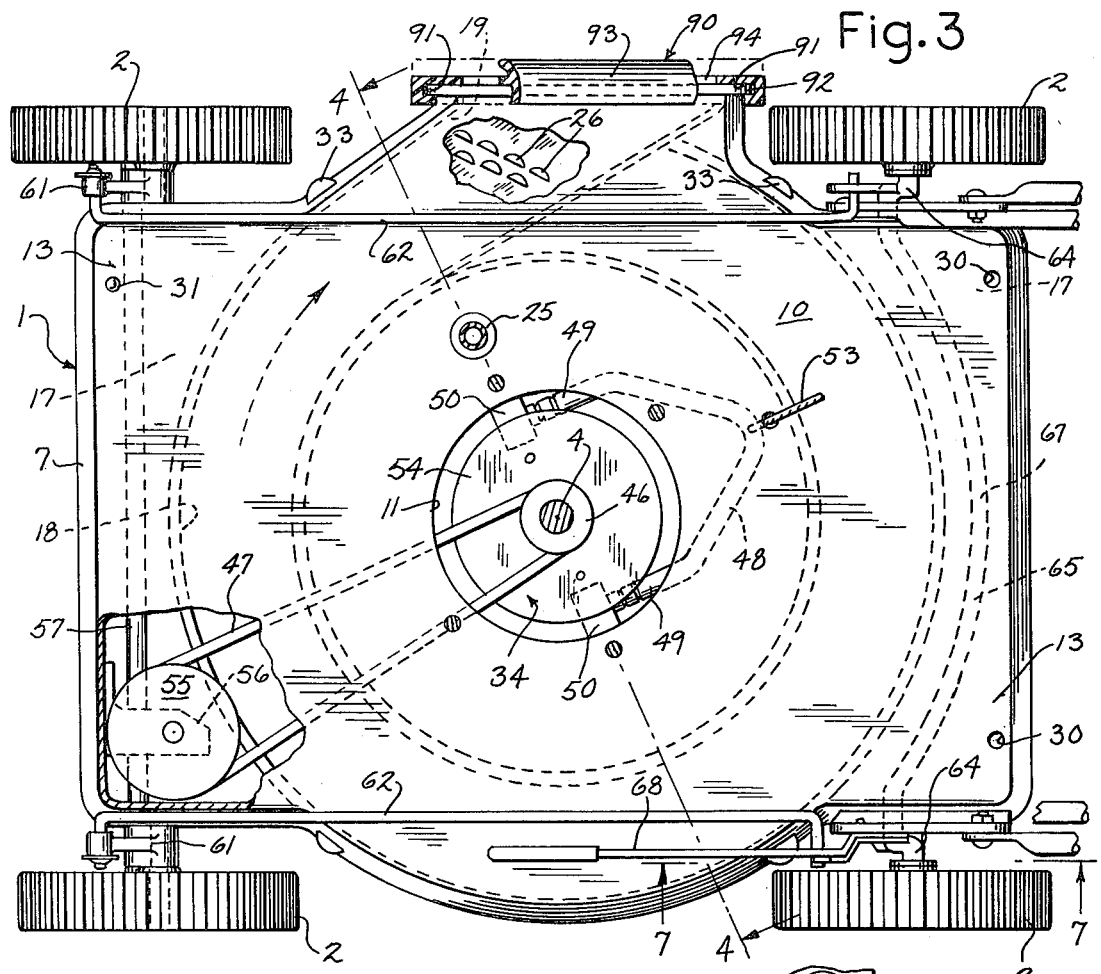
FIG. 3 is a top plan view of the mower housing with the upper shroud removed and parts broken away in section.

The drawings illustrate a rotary lawn mower including a housing 1 which carries a series of wheels 2. A standard gasoline engine 3 is mounted on the housing 1, and the drive shaft 4 of the engine extends downwardly within the housing and carries a rotary cutting blade 5. The mower is adapted to be directed over the ground by means of a handle assembly 6 which is connected to the rear end of the housing 1.

The housing 1 includes an outer housing section 7 and an inner housing section 8 with the space between the housing sections defining a closed compartment or chamber 9. The outer housing section 7 is provided with an upper flat deck 10 having a central opening 11, and the engine 3 is mounted on the deck 10 and the drive shaft 4 extends downwardly through the opening 11.

Outer housing section 7 also includes a peripheral skirt 12 which slopes downwardly and outwardly from deck 10. As best shown in FIG. 3, the housing section 7 includes generally rectangular front and rear end sections 13, and the central portion of housing section 7 is provided with a discharge outlet 14 through which the grass clippings are discharged from the housing.

Figure 4:
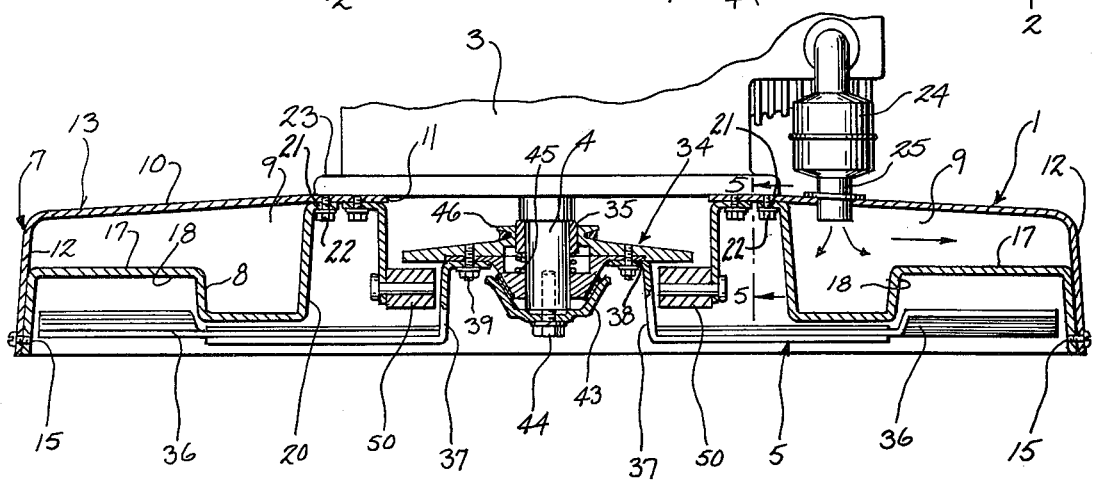
FIG. 4 is a section taken along line 4—4 of FIG. 3.

The inner housing section 8 is shaped to complement the outer housing section 7 and is provided with a peripheral flange 15 which is secured to the lower edge of skirt 12 by screws 16. As best illustrated in FIG. 4, the inner housing section 8 includes a pair of rectangular deck sections 17 which are spaced beneath the end sections 13 of the outer housing section 7. The central portion of the inner housing section defines a torus 18 which terminates in a discharge outlet 19 that registers with the discharge outlet 14 of the outer housing section 7.

As shown in FIG. 4, the central portion of the inner housing section 8 is provided with an opening 20 which is bordered by a flange 21, and the flange 21 is secured by screws 22 to the peripheral edge of the outer housing section 7 bordering opening 11, as well as to the mounting plate 23 of the engine 3.

With this construction the inner housing section 8 complements and is secured to the outer housing section 7 so that the compartment 9 is a generally sealed chamber. The use of the two housing sections 7 and 8 enables the upper deck 10 of the outer housing section to be relatively flat, thereby facilitating cleaning and enhancing the appearance of the mower, and the torus 18, which is desirable for efficient discharge of grass, is located only in the lower housing section. Thus, the use of the pair of housing sections 7 and 8 provides a unit which can be readily cleaned and yet has the efficient discharge characteristics that accompany the use of a torus.

In accordance with a feature of the invention, the exhaust gases of the engine 3 are directed through a muffler 24 and the outlet of the muffler is connected by a conduit 25 to the chamber 9, as shown in FIG. 4. A series of louvered exhaust ports 26 (See FIG. 3) are provided in torus 18 of the inner housing section 8 adjacent the discharge outlet 19 so that the exhaust gases eminating from the engine and passing through the chamber 9 are discharged toward the outlet 19.

The chamber 9 serves as a sound deadening compartment and substantially reduces the noise level of the mower. While the drawings illustrate the exhaust gases passing through the muffler 24 before being introduced into the chamber 9, it is contemplated that the exhaust gases can be conducted directly to the chamber 9 without the use of the muffler 24.

An upper shroud 27 can be connected to the outer housing section 7 and serves to provide a cleaner, more attractive appearance for the mower, as well as increasing the sound deadening characteristics. The shroud 27 is provided with a peripheral flange 28 and a pair of generally L-shaped clips 29 extend downwardly from the forward portion of the shroud and are adapted to be received within slots 30 formed in the upper outer housing section 7. The opposite end of the shroud is attached to the outer housing section 7 by means of a pair of ball-shaped projections 31 which extend upwardly from the upper deck 10 of housing section 7 and are received within cylindrical sleeves 32 carried by the shroud 27.

To attach the shroud 27 to the upper housing section 7, the shroud is tilted to a position where the clips 29 can be inserted within the slots 30, as generally shown in FIG. 17. The opposite end of the shroud is then pivoted downwardly until the projections 31 are clamped within the sleeves 32.

As best illustrated in FIG. 3, the outer housing section 7 is provided with a series of outwardly extending projections 33 which extend outwardly from the skirt 12 and serve as nesting stops during manufacture. As previously noted, the outer housing section and inner housing section have generally sloping walls thereby enabling the housing section to be stacked during manufacture. The projections 33 serve as stops to be engaged by the lower edge of an upper nesting housing section, thereby limiting the degree of nesting and facilitating removal of the housing sections from the nested position.

The drive mechanism for rotating the blade 5 is best illustrated in FIGS. 4, 5 and 18, A hub or rotatable member 34 is journalled on the lower end of the drive shaft 4 by a bushing 35 and blade sections 36 of blade 5 are connected at diametrically opposite positions to the hub 34. Each blade section 36 includes an inner, upwardly extending section 37 which terminates in a generally horizontal flange 38 that is connected to the undersurface of the hub 34 by bolts 39. The lower end of the hub 34 is frustoconical in shape and is provided with a clutch pad or element 41 which is adapted to engage a similar clutch pad or element 42 carried on the inner end of a conical cup 43 that is attached to the lower end of drive shaft 4 by bolt 44. The cup 43 is integral with the drive shaft 4 and rotates with the drive shaft. When the clutch elements 41 and 42 are in engagement, rotation of the shaft 4 and cup 43 will be transmitted to the hub 34 to thereby rotate the blade.

The clutch elements 41 and 42 are biased into engagement by a coil spring 45 which is located within a recess in the hub. The upper end of the spring bears against the fixed bushing 35, while the lower end of the spring bears against the hub to urge the hub and the clutch element 42 downwardly into engagement with the clutch element 41.

The upper end of the hub 34 defines a pulley 46 which is connected by a belt 47 to a drive mechanism for propelling the front wheels of the mower, as will hereinafter be described.

As previously noted, the spring 45 acts to urge the clutch elements 41 and 42 into engagement to provide a direct driving connection between the drive shaft 4 and the blade 5. Disengagement of clutch elements 41 and 42 will act not only to disengage the drive to the wheels to stop movement of the mower, but will also stop rotation of the blade. This latter action is accomplished by means of a yoke 48 which is located within the opening 20 of the inner housing section 8, and the arms 49 of the yoke straddle the hub 34. Each arm 49 of the yoke is connected to a block 50 which is pivotally connected by a pin to the lower end of a bracket 51 that is attached to the upper deck 10 of outer housing section 7. This connection permits the outer end of the yoke 48 to pivot vertically within a slot 52 formed in the inner housing section 8. Cable 53, which extends to the handle assembly 6, is attached to the end of the yoke. By pulling the cable 53 upwardly, the outer end of the yoke will be pivoted upwardly thereby bringing the arms 49 into engagement with the lower surface of the central disc-like section 54 of the hub 34 to raise the hub upwardly relative to the drive shaft 4 and disengage the clutch elements 41 and 42. With the clutch elements 41 and 42 disengaged, the drive connection through pulley 46 and belt 47 to the front wheels will be disengaged and the driving connection to the blade 5 will similarly be disengaged so that disengagement of the wheel drive will simultaneously stop rotation of the blade.

The belt 47 which is carried by pulley 46 acts to drive a pulley 55 located within the front portion of the outer housing 7. Pulley 55 is secured to a vertical shaft which constitutes the input shaft for a gear box 56 mounted on the outer housing section 7. The horizontal output shaft 57 of the gear box extends transversely of the housing and the ends of the shaft 57 carry pinions 58, as best shown in FIG. 6, which are engaged with internal gear rings 59 located on the hubs of the front wheels 2. Rotation of the shaft 57 will drive pinions 58 to thereby rotate the front wheels 2 and propel the mower over the ground.

Each of the front wheels 2 is mounted for rotation on a stub shaft 60 which is mounted axially of the wheel 2, and the inner end of each stub shaft 60 is pivotally connected to one end of a bell crank 61 that is pivotally mounted on the shaft 57. The opposite end of the bell crank 61 is connected to one end of a rod 62 which extends longitudinally of the housing to the corresponding rear wheel of the mower. The rear end of each rod 62 is pivotally connected to an arm 63 which is secured to the outer bent portion 64 of rear axle 65 that carries the rear wheels 2. The hub 66 of each of the rear wheels 2 is journalled on the horizontally projecting end of the axle 65. As best shown in FIG. 3, the central portion of the axle 65 is curved as indicated at 67 so that it can extend transversely across the housing between the inner housing section 8 and outer housing section 7.

The rods 62 serve to interconnect the front and rear wheels along each side of the mower so that the front and rear wheels can be raised or lowered in unison to change the cutting height of the blade.

To raise or lower the wheels with respect to the housing, an adjusting handle 68 is secured to the arm 63 which in turn is secured to the offset crank portion 64 of axle 65. By pivoting the handle 68 from the position shown by the solid lines in FIG. 7 to the position shown in the dashed lines, the axle 65 will pivot and rear wheels 2 will be raised with respect to the housing. As the front wheels are tied into the rear wheels through the rod 62, the position of the front wheels with respect to the housing will be correspondingly changed. Thus, pivoting handle 68 from the solid line position in FIG. 7 to the dashed position will simultaneously lower all four wheels with respect to the housing to increase the cutting height. The driving connection between the pinions 58 and the gear rings 59 of the front wheels will not be disturbed by the raising and lowering of the front wheels.

To lock the wheels in position with respect to the housing, a spring locking arm 69 is secured to the lower portion of the adjusting handle 68 and extends upwardly from the handle. The upper end of the locking arm 69 carries a pin 70 that is adapted to be engaged in one of a series of holes 71 which are spaced along a radius in a plate 72 attached to the housing 1. As the adjusting handle 68 is pivoted, the locking arm 69 will correspondingly be pivoted so that the pin 70 can be inserted within the desired hole 71 to lock the wheels at any desired position. The locking arm 69 is a spring member designed so that the upper portion of the locking member is urged toward the plate 72 to maintain the locking engagement of the pin 70 with the hole 71. With this construction, the cutting height of the blade 5 can be readily varied by releasing the locking pin 70, pivoting the adjusting handle 68 and reinserting the pin within the desired hole 71. This action will automatically raise or lower all four of the wheels but will not disrupt the connection between the drive shaft 58 and the front wheels 2.

Another feature of the invention is a folding handle assembly 6 which can be folded to a storage position, as shown in FIG. 2, wherein the entire handle is located within the periphery of the housing 1. As best shown in FIGS. 1, 2, 9 and 10, the handle assembly includes a pair of lower arms 73 having their lower ends pivotally connected at 74 to plates 72 which extend upwardly from the housing 1. The free ends of a U-shaped member 75 are also pivotally connected to plate 72 at pivots 76 spaced forwardly of the pivots 74. As best shown in FIGS. 9 and 10, the ends of a U-shaped upper handle member 77 are pivotally connected to the upper ends of the lower arms 73 by bolts 78, and arms 73 are urged laterally inward toward the ends of the upper handle member 77 by springs 79 which are located around the bolts 78 and extend between the heads 80 of the bolts and the arms 73.

The central portion of the upper U-shaped member 77 is provided with a handle 81 and a pair of operating levers 82 and 83 are pivotally connected to the handle 81. Lever 82 is connected to the cable 53 and acts to operate the yoke 48 to thereby disengage the clutch, while lever 83 is connected to a standard throttle cable 84 which is connected to the throttle of the engine. Cables 54 and 84 extend through suitable slots 85 in the shroud 27, as shown in FIG. 1.

The upper ends of the lower arms 73 are provided with hand grips 86.

To lock the handle assembly in the extended or operating position, a stud 87 extends through each arm of the lower U-shaped member 75, through an aligned opening in the corresponding end of the U-shaped upper member 77 and the head thereof is adapted to engage the respective lower arm 73. As best shown in FIG. 10, the head 88 of stud 87 acts as a detent and is engaged within a hole 89 in the respective arm 73 to lock the handle assembly in the extended position.

To fold the handle assembly to the storage position, the hand grips 86 are moved outwardly against the force of the springs 79 to thereby release the heads 88 from holes 89. The handle assembly can then be pivoted downwardly to the storage position, as shown in FIG. 2, wherein the entire handle is located within the outer periphery of the housing 1. The unique folding arrangement is achieved through the four-point connection comprising the pivots 74, 76, 78 and 87, which provides a parallelogram-shaped linkage when the handle assembly is in the folded position. As the handle assembly 6 can be folded to a storage position in which the entire handle is located within the perimeter of the housing, the mower can be shipped with the handle in the assembled position. This feature reduces showroom and customer set-up time as well as reducing the overall size of shipping containers. Because of the unique handle folding feature, it is contemplated that the shipping container, if desired, can be designed so that it can be used by the customer as a permanent storage facility for the mower.

A deflector unit 90 is normally attached to the grass discharge outlet 14 in the housing. Deflector unit 90 is provided with vertical guideways 91 in its vertical side edges which are adapted to receive slidably vertical flanges 92 bordering the discharge opening 14 in the housing. The guideway 91 and flanges 92 provide a sliding connection wherein the deflector unit can be readily engaged and disengaged from the housing.

The deflector unit 90 includes an upper outwardly extending curved deflector 93 which acts to deflect the grass clippings downwardly horizontal, and a toe-bar 94 extends between the vertical side edges of the deflector unit and serves to prevent objects from being accidentally inserted through the discharge opening into contact with the rotating blade.

Figure 13:
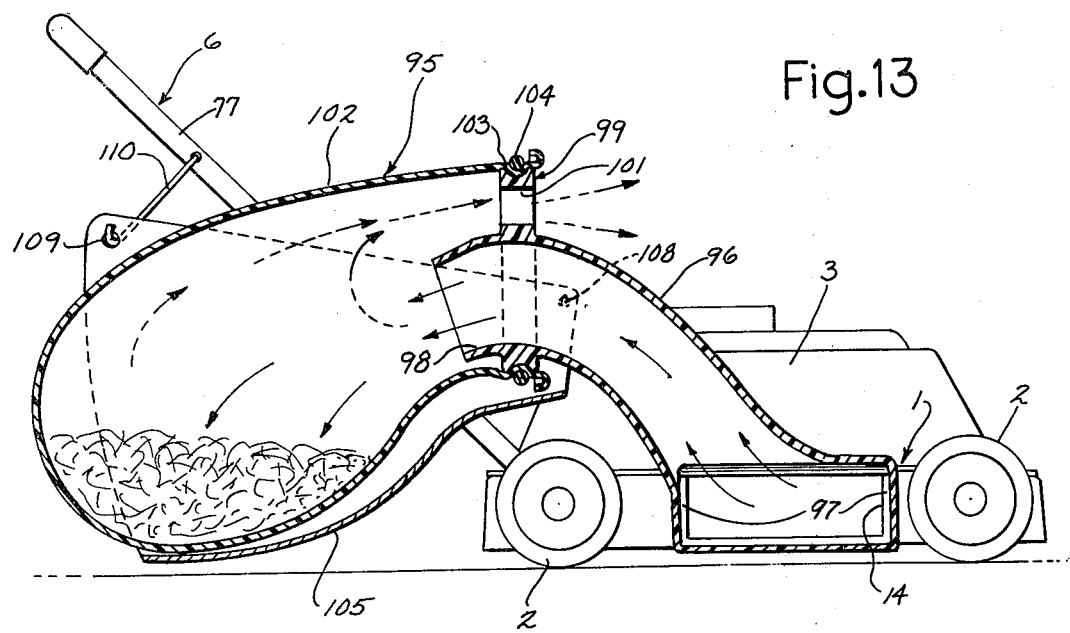
FIG. 13 is a side elevation of the mower of the invention incorporating a grass catching bag.

The lawn mower of the invention also includes a grass catching unit 95, illustrated in FIG. 13, as an optional accessory that can be removably attached to the discharge opening 14 in the housing 1. The grass catching unit 95 includes an adapter or chute 96 and one end of the chute is provided with a pair of vertical guideways 97, similar to guideways 91 of the deflector unit, which are slidably engaged with the flanges 92 on the housing to connect the chute to the housing. The opposite end of the chute 96 defines an outlet 98 and a generally rectangular frame 99 is formed integrally with the chute adjacent the outlet.

The frame has a substantially greater cross sectional dimension than the outlet 98 and defines a pair of upper openings 101 which are located above and to the side of outlet 98.

The open end of an impervious, plastic throw-away bag 102 is adapted to be connected to the frame 99. To facilitate the connection, the frame 99 is provided with a circumferential groove 103 and the open end of the bag 102 is attached within the groove by means of an elastic cord 104. When the mower is operated, the grass clippings will be discharged from the housing through the chute 96 and outlet 98 into the bag 102. Due to the impervious nature of the bag, the air within the bag will be discharged through the openings 101 which are located vertically above and to the side of the outlet 98 in the chute 96.

Figure 15:
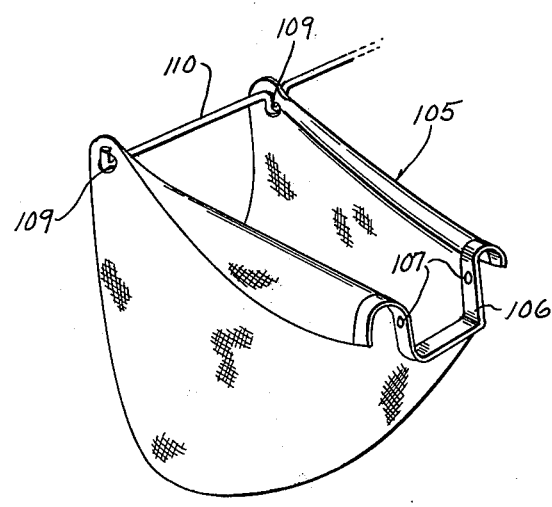
FIG. 15 is a view of the protective bag used in the grass catching attachment with the inner throw-away bag and the chute removed.

It is preferred to support the plastic bag 102 in an outer protective bag, as illustrated in FIG. 13. In this situation, the outer protective member, as best shown in FIG. 15, can be formed of canvas or the like and is in the form of a sling 105. In this case, the neck 106 of the sling 105 is provided with openings 107 which receive hooks 108 on the outlet end of the chute 96 to hold the neck against the chute. The opposite end of the sling 105 is provided with a pair of eyelets 109, and a wire support 110 connects the eyelets to the handle 6 to hold the sling in position. The sling serves to support the plastic bag 102 and as the upper end of the sling is open, the plastic bag can be readily removed from the sling. As the grass clippings are collected in the throwaway bag 102, the bag can merely be discarded when filled and replaced with a new bag, and it is not necessary to transfer or dump the clippings from the grass-catching bag to a storage container.

Figure 16:
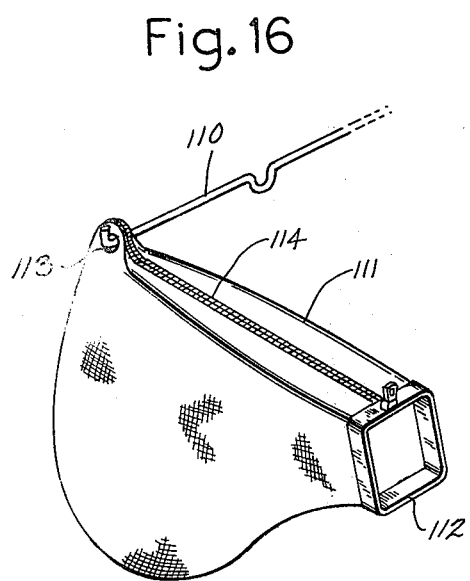
FIG. 16 is a view similar to FIG. 15 and showing a modified form of the protective bag.
Figure 14:
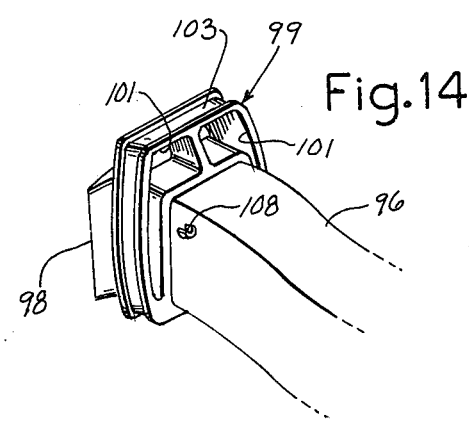
FIG. 14 is a perspective view of the outlet end of the chute of the grass catching attachment.

FIG. 16 illustrates a modified form of the bag arrangement in which the bag 102 is supported in a protective bag 111. In this embodiment, the bag 111 is closed and has a neck 112 which is secured to the chute 96 through the elastic cord 104 and the wire support 110, which is attached to handle member 77, extends through an opening 113 or eyelet in the closed end of the bag. A zipper 114 or other closure can be located in the upper surface of the bag to facilitate removal of the impervious plastic bag 102 therefrom.

Various modes of carrying out the invention are contemplated as being within the scope of the following claims particularly pointing out and distinctly claiming the subject matter which is regarded as the invention.

I claim:

1. A grass catching attachment for connection to a rotary lawn mower, said lawn mower including a housing having a discharge outlet, power means mounted on the housing, and rotary cutting means disposed within the housing and operably connected to said power means, said mower also including handle means attached to the housing, said attachment comprising chute means removably connected with the housing and having one end communicating with said discharge outlet, the opposite end of said chute means defining an outlet opening, means connected to said opposite end of the chute means and defining a second opening located adjacent said outlet opening, an impervious throw-away bag having a neck bordering an open end thereof, means for removably securing the neck of the bag around said outlet opening and around said second opening, whereby grass clippings being discharged from the housing pass through the chute means and through said outlet opening into the bag and air is discharged from the bag through said second opening to the exterior, flexible protective support means carried by the mower for supporting the throw-away bag, and connecting means for removably attaching a portion of said protective support means to said chute means.

2. The structure of claim 1, in which said protective support means constitutes a sling having a closed bottom portion and an open upper portion, one end of said sling being removably attached to said chute means adjacent said outlet opening and the opposite end of said sling being removably connected to said handle means.

3. The attachment of claim 1, wherein said protective support means comprises an outer closed bag disposed around said throw-away bag, the outer bag including an opening in the upper surface thereof, and a releasable closure for closing said opening in the outer bag to permit removal and installation of the throw-away bag when the closure is in the released position.

4. The attachment of claim 1, and including means slidably attaching said first named end of said chute means to said housing.

5. The attachment of claim 1, wherein said means defining a second opening comprises a frame attached to said chute means, said frame defining a second opening located above and to the side of the outlet opening in the chute means.

* * * * *